United States Patent
Kapoor et al.

(10) Patent No.: US 10,083,296 B2
(45) Date of Patent: Sep. 25, 2018

(54) DETECTION OF MALICIOUS THREAD SUSPENSION

(71) Applicant: McAfee, LLC, Plano, TX (US)

(72) Inventors: Aditya Kapoor, Portland, OR (US); Joel R. Spurlock, Portland, OR (US); Jonathan L. Edwards, Portland, OR (US)

(73) Assignee: McAfee, LLC, Plano, TX (US)

( * ) Notice: Subject to any disclaimer, the term of this patent is extended or adjusted under 35 U.S.C. 154(b) by 254 days.

(21) Appl. No.: 14/752,890

(22) Filed: Jun. 27, 2015

(65) Prior Publication Data
US 2016/0378979 A1    Dec. 29, 2016

(51) Int. Cl.
G06F 21/55 (2013.01)
G06F 21/85 (2013.01)
H04L 29/06 (2006.01)

(52) U.S. Cl.
CPC ............ G06F 21/554 (2013.01); G06F 21/85 (2013.01); H04L 63/145 (2013.01); G06F 2221/033 (2013.01); G06F 2221/2105 (2013.01)

(58) Field of Classification Search
CPC .. G06F 21/554; G06F 2221/033; G06F 21/85; H04L 63/14
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 6,698,016 B1* | 2/2004 | Ghizzoni ............ G06F 9/4426 712/E9.083 |
| 7,506,155 B1 | 3/2009 | Stewart et al. |
| 8,959,639 B2* | 2/2015 | Shevchenko .......... G06F 21/52 726/22 |
| 2009/0038008 A1* | 2/2009 | Pike ...................... G06F 21/52 726/22 |
| 2009/0049550 A1 | 2/2009 | Shevchenko |
| 2009/0199297 A1 | 8/2009 | Jarrett et al. |
| 2010/0257608 A1* | 10/2010 | Jeong ................... G06F 21/566 726/24 |

FOREIGN PATENT DOCUMENTS

WO    2017003597    1/2017

OTHER PUBLICATIONS

International Search Report and Written Opinion in International Application No. PCT/US2016/034210 dated Aug. 16, 2016.

* cited by examiner

*Primary Examiner* — Wasika Nipa
(74) *Attorney, Agent, or Firm* — Patent Capital Group (57) ABSTRACT

In an example, there is disclosed a computing apparatus having one or more logic elements providing a security agent operable for: detecting that a first process has launch a second process and placed the second process in a suspended state; detecting that the first process has modified or attempted to modify the second process; classifying the modification as potentially malicious; and taking a remedial action. There is also disclosed one or more computer-readable storage mediums having stored thereon executable instructions for providing the security agent, and a computer-executable method of providing the security agent.

18 Claims, 6 Drawing Sheets

DETECTION OF MALICIOUS THREAD SUSPENSION

FIELD OF THE SPECIFICATION

This disclosure relates in general to the field of computer security, and more particularly, though not exclusively to, a system and method for detection of malicious thread suspension.

BACKGROUND

One of the goals of many malware authors is to attack a computer system by attaching malware instructions to a process that has elevated privileges. This may allow the malware instructions to bypass firewalls, access system resources, change permissions, and launch other processes.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

In an example, there is disclosed a computing apparatus having one or more logic elements providing a security agent operable for: detecting that a first process has launch a second process and placed the second process in a suspended state; detecting that the first process has modified or attempted to modify the second process; classifying the modification as potentially malicious; and taking a remedial action. There is also disclosed one or more computer-readable storage mediums having stored thereon executable instructions for providing the security agent, and a computer-executable method of providing the security agent.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

One primary concern for malware authors is granting their malware programs elevated privileges on the system. Stated differently, it is irrelevant how clever an exploit is or how effectively it inserts itself into a process if the process itself does not have sufficient rights on the system to perform what the malware author considers "useful work." To provide just one example, an SQL injection attack against a database driver that merely has rights to alter a webpage display may be useful for defacing the webpage, but may not be useful for collecting privileged information from the backend database server. Thus, rather than merely injecting malware into unprivileged processes, it is a desire of many malware authors to inject malicious instructions into privileged processes.

To provide just one example, many Microsoft Windows-based computing systems run Internet Explorer under the process "iexplore.exe." An advantage of the iexplore.exe executable from the malware authors standpoint is that it usually has rights to bypass some or all firewall rules, whereas other processes may be blocked by the firewall. Thus, a successful attack against iexplore.exe may grant the malware author unrestricted access to network resources.

Similarly, many other privileged processes may be found on a computing system. A malware object that successfully injects itself into those processes gains all the rights of that process.

In one example, a malware object uses a suspended thread to inject itself into the privileged process. In this example, the malware object launches the privileged process in a suspended state, or launches the process and immediately suspends its sole thread. Once the process is launched and suspended, the malware object overwrites certain portions of the memory to inject its own instructions. These instructions may, for example, point to malware subroutines that perform malicious activity, such as self propagating, collecting private user data, or instructing the host to act as a "botnet."

According to a system and method disclosed in the present specification, a security agent running on the host monitors the launch of new processes. The security agent is intelligent enough to recognize that there are certain contexts where it is legitimate for a first process to launch a second process, for a first process to suspend a second process, or for a first process to modify a second process. To provide just one example, a first process may be a plug-in to Internet Explorer. This plug-in may be intended to modify some of the behavior of Internet Explorer. Thus, when iexplore.exe is launched, the plug-in may overwrite certain memory locations to point to subroutines that the plug-in uses to do its intended work. This is not generally considered malicious as long as the plug-in discloses it purpose to users, and does not perform work in the background that is malicious. Thus, in a properly functioning security environment, the plug-in should be allowed to function.

However, the security agent of the present specification may intelligently recognize that the combination of launching a different process in a suspended state and overwriting portions of the memory together may be considered suspicious. Even this combination may not necessarily be malicious, however. Thus, additional logic may be provided, for example to determine which portions of the suspended process have been overwritten.

In one example, a malware object overwrites an entry point of the suspended process. This completely co-opts the functionality of the original process, turning it into a malware object that simply has the name and privileges of the original process. This species of attack may generally be referred to as subversion of the legitimate process by a malware object.

This behavior can be detected and marked as likely malicious. In some cases, when an object performs such likely malicious actions, it may be blocked, or it may require special dispensation from the user or a security administrator before it is allowed to continue functioning.

Subversion is a particularly dangerous kind of attack, because security scanners and antivirus programs may not recognize the subverted process as a malware object. Because it has the identity and privileges of a trusted process, the subverted process may have free reign over system without the antivirus scanner being any the wiser. Thus, it is advantageous to recognize not only that a process has been subverted, but also to trace the subverted process back to the subverting process. By doing this, the antivirus scanner or security agent can successfully block not only the subverted process, but also quarantine the subverting process. This protects other processes on the system from similarly being subverted by the malware object.

It should be recognized that this specification discloses several examples of methods of detecting that a process has been launched with a suspended thread, identifying the process that launched the suspended process, and identifying behavior as malicious behavior. It should be understood, however, that the methods disclosed herein are provided by way of nonlimiting example only. In a general sense, there are multitudinous ways to detect that a process has been launched in a suspended state, and there are almost limitless ways in which a malware object may attempt to subvert that process. Thus, it is anticipated that a security agent operating according to the present specification will be subject to updates as new malware attacks are identified. These updates may provide additional filters for characterizing and identifying additional types of malware attacks. Thus, it should be understood that as the present specification discusses several examples of attacks that can be detected, and filters for identifying those attacks, the intention is to illustrate the operation of the disclosed system and method. These illustrative examples should not be considered an exhaustive list, or an exclusive list.

A system and method of the present specification will now be described with more particular reference to the appended figures.

Figure 1:
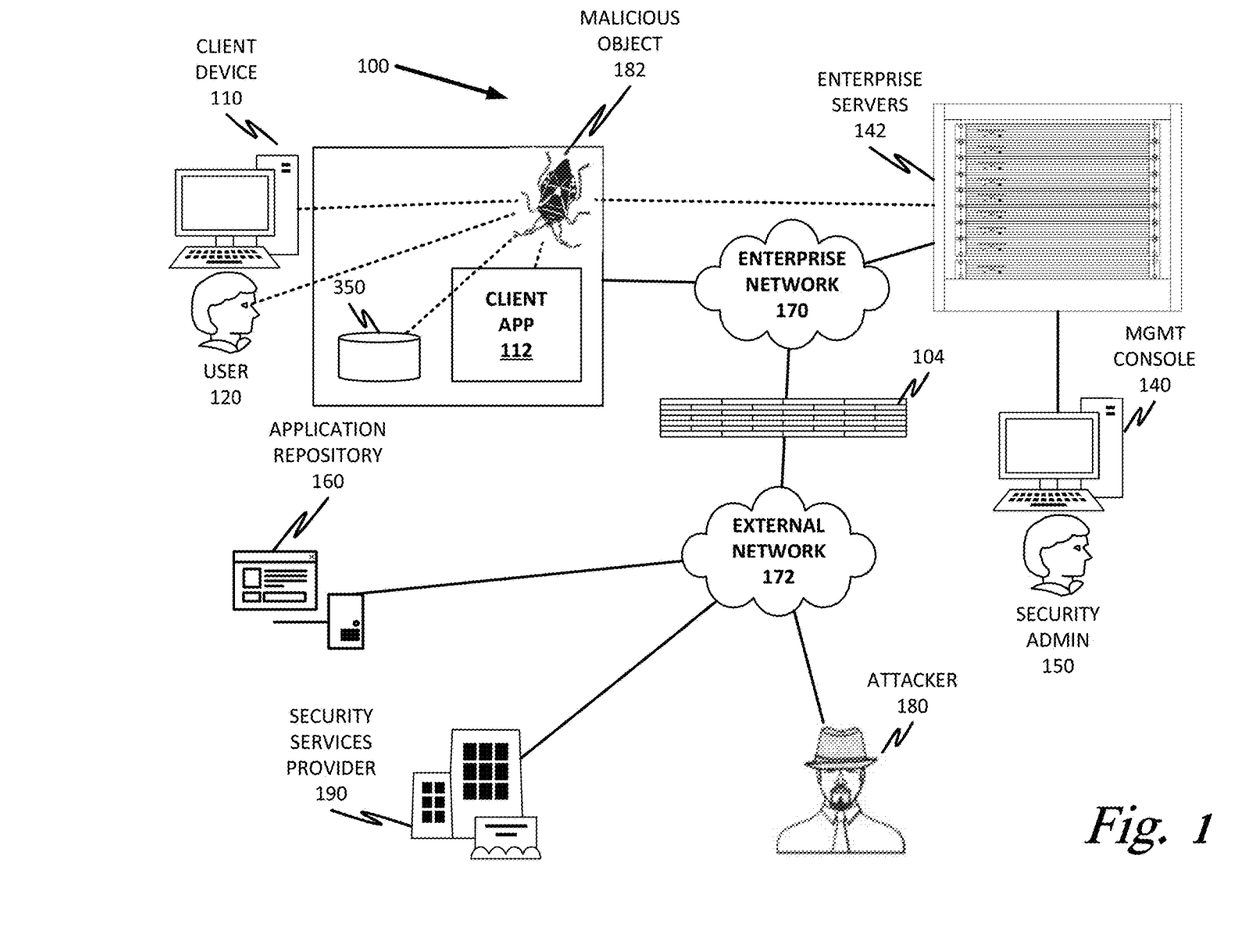
FIG. 1 is a block diagram of a security-enabled network according to one or more examples of the present specification.

FIG. 1 is a network-level diagram of a secured enterprise 100 according to one or more examples of the present specification. In the example of FIG. 1, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computes, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. It should also be noted that some functionality of endpoint devices 120 may also be provided via workload cluster 142. For example, one microcloud may provide a remote desktop hypervisor such as a Citrix workspace, which allows users 120 operating endpoints 120 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 122 (which may be running in memory), or gaining access to enterprise servers 142. In one example, malware object 182 accomplishes this by subverting legitimate processes to take advantage of those processes' legitimate identity and privileges.

In one example, malicious object 182 may gain access to system resources by launching a privileged process, such as a process that has elevated rights and system access, rights to bypass firewall rules, or other similar rights, by launching the process and immediately suspending it. Malware object 182 may then modify instructions in the suspended memory, so that the instructions point to malware routines. The malware routines thus inherit the privileges of the suspended process, and when the process is brought out of suspension, it launches the malware routines with elevated privileges.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
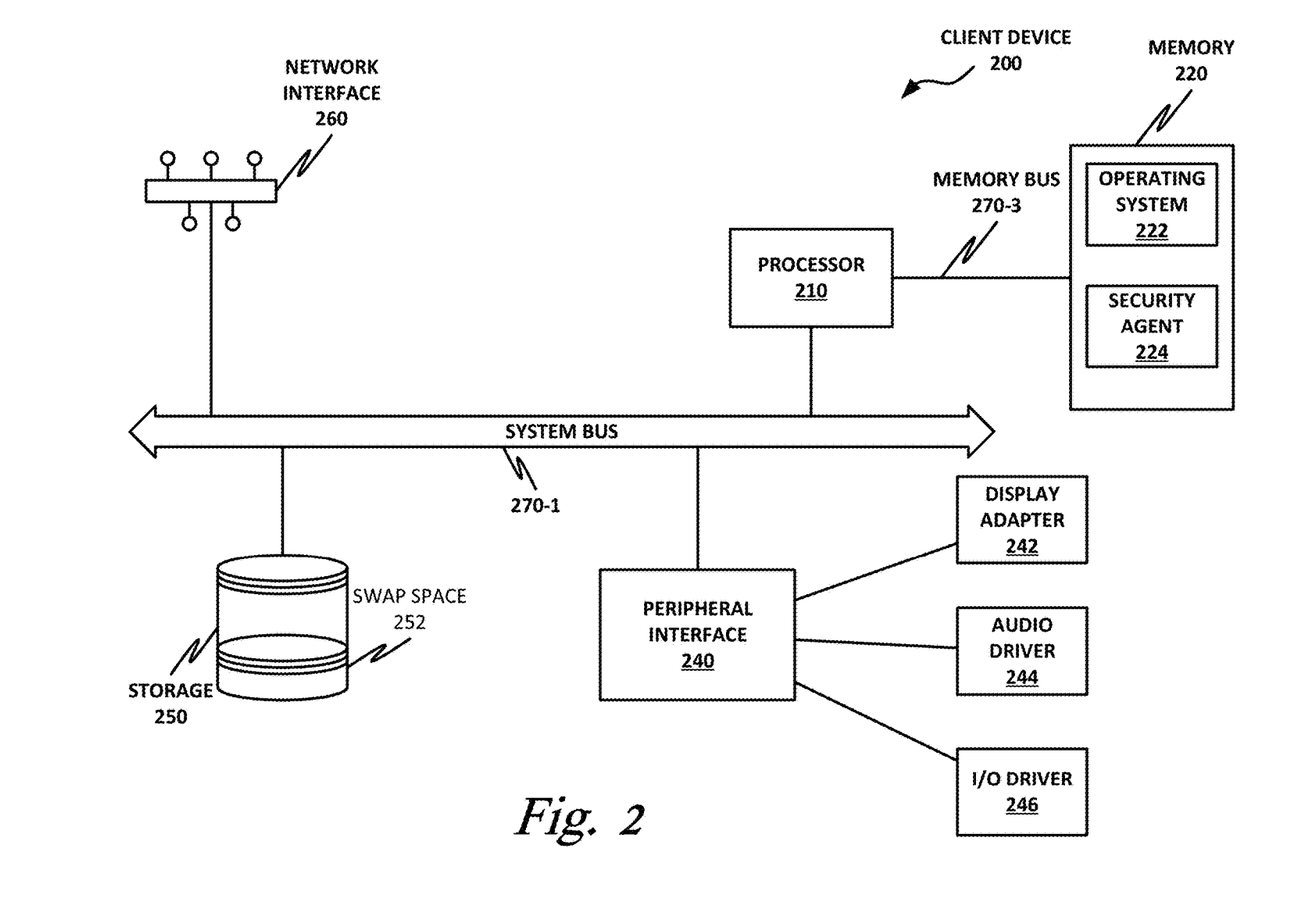
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In certain embodiments, client devices 110 may all be examples of computing devices 200.

Computing device 200 includes a processor 210 connected to a memory 220, having stored therein executable instructions for providing an operating system 222 and at least software portions of a security agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Storage 250 may also include a swap file or swap partition. The "swap" partition is a type of high-latency memory store where programs can be placed when they are not active. In an example, a state machine, such as the state machine of FIG. 5.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security agent 224 may include one or more tangible non-transitory computer-readable mediums having stored thereon executable instructions operable to instruct a processor to provide a security agent 224. As used throughout this specification, an "engine" includes any combination of one or more logic elements, of similar or dissimilar species, operable for and configured to perform one or more methods provided by the engine. Thus, security agent 224 may comprise one or more logic elements configured to provide methods as disclosed in this specification. In some cases, security agent 224 may include a special integrated circuit designed to carry out a method or a part thereof, and may also include software instructions operable to instruct a processor to perform the method. In some cases, security agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security agent 224 may also include other hardware and software, including configuration files, registry entries, and interactive or user-mode software by way of non-limiting example.

In one example, security agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security agent 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digial outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
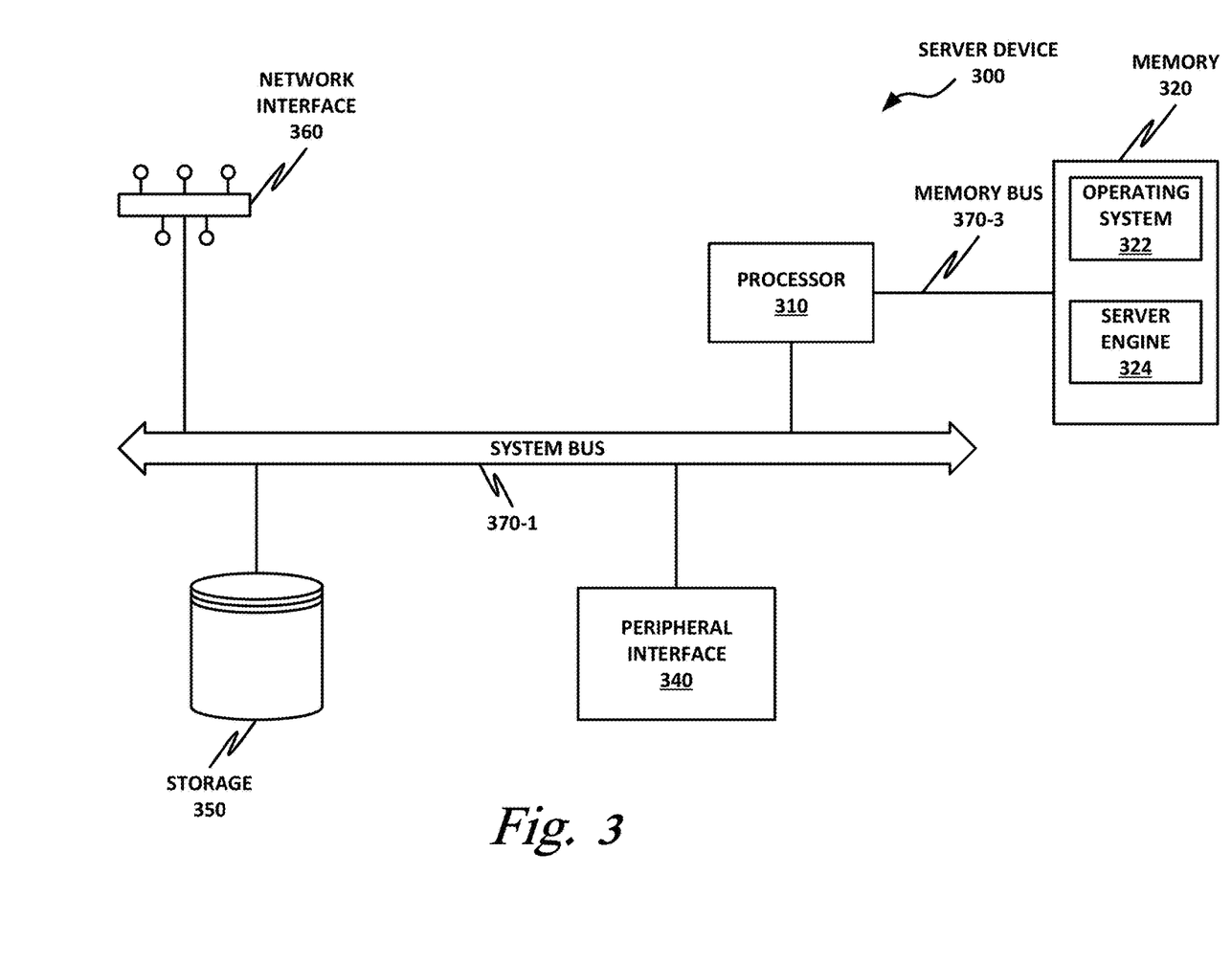
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security agent. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
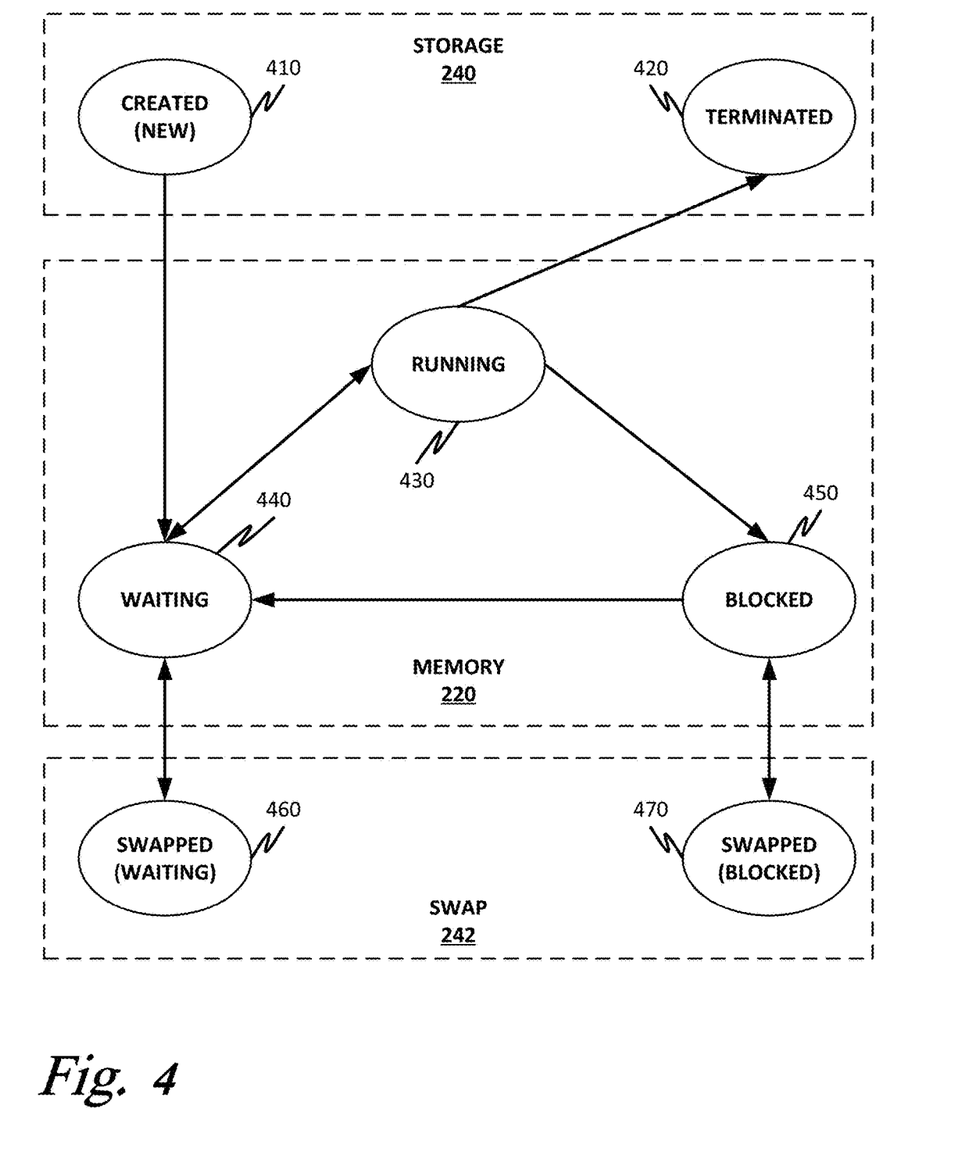
FIG. 4 is a block diagram of a state machine of a process life cycle according to one or more examples of the present specification.

FIG. 4 is a block diagram of state machine illustrating the states that a process may move through in its lifetime. Summaries of the states include the following.

Created 410—The state of newly created processes (also sometimes labeled "New"). In this state, the process awaits admission to the "ready" state. This admission may be approved or delayed by an admission scheduler. Admission may be automatic for ordinary multi-tasking operating systems. However, real time systems may need to tightly control access to system resources, and thus may not admit too many states to the "ready" state at once.

Waiting 440—A "ready" or "waiting" process has been loaded into main memory and is awaiting execution on a processor. The short term scheduler (dispatcher) context switches processes to each processor. Multitasking operating systems can handle multiple concurrent processes, but the number of processes executing at any one time is limited by the number of CPU cores. Thus, many processes may be "ready" at any one time. For example, in a single-core system, only one process may execute at any one time, and all other "concurrently executing" processes will be waiting for execution. Processes that are ready for the CPU are kept in a queue for "ready" processes. Other processes that are waiting for an event to occur, such as loading information from a hard drive or waiting on an internet connection, are not in the ready queue.

Running 430—A process is "running" when the dispatcher has dispatched it to a processing core for execution. The process's instructions are executed by a processor or processing core. Generally, only one process is "running" on a single processing core at a time.

Blocked 450—A process may be "blocked" when it is waiting on an event (such as completion of an I/O request), or when it has exhausted its allotted processor time.

Terminated 420—A process may self-terminate after completing execution, or it may be externally "killed" by the operating system. In either case, the process moves to the "terminated" state. Although the underlying process is no longer executing, the process may remain in the process table (a "zombie" process) until its parent process executes a system "wait" call to read its exit status. The process is then removed from the process table. If the parent fails to read the exit state, the zombie process consumes an entry in the process table, causing a resource leak.

Suspended (Waiting) 460—Also called swapped and waiting. In systems that support virtual memory, a process may be "swapped out" from main memory and placed in a special "swap" file or partition on the storage device. Before the process can execute again, it generally must be swapped back into the "waiting" state. A process is considered to be in a suspended state if at least one of its threads is suspended.

Suspended (Blocked) 470—Blocked processes may also be swapped (suspended) to disk. When the process is swapped back into main memory, it is swapped back to the "blocked" state. If the event it was waiting on has completed, the process proceeds to "wait." If not, the process remains in its "blocked" state. For purposes of this specification, a process is considered to be in a suspended state if at least one thread is suspended, whether it is blocked, waiting, or in some other suspended state.

Figure 5:
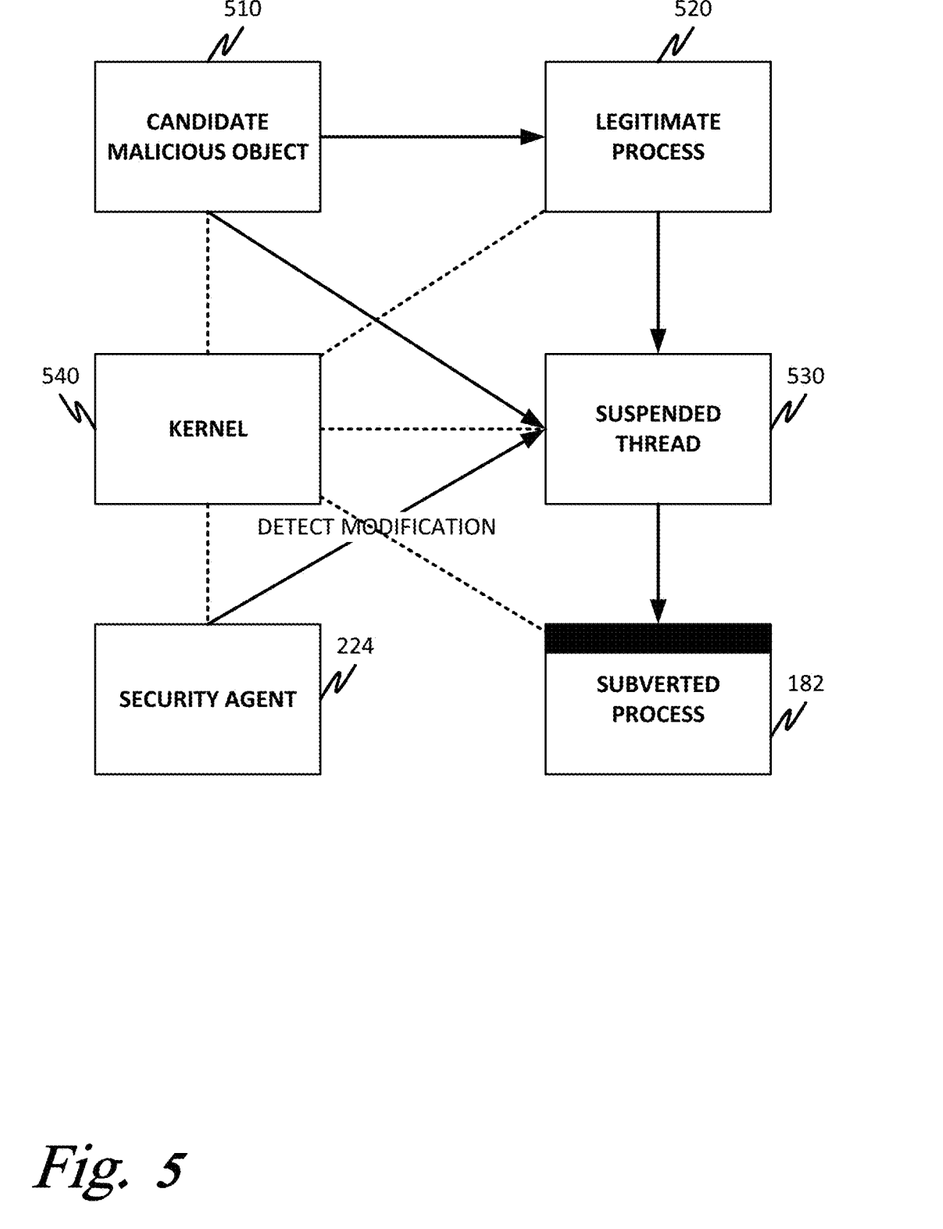
FIG. 5 is a block diagram of subversion of a process according to one or more examples of the present specification.

FIG. 5 is a block diagram of system processes according to one or more examples of the present specification. In this example, candidate malicious object 510 creates legitimate process 520 in a suspended state. This example uses Microsoft Windows processes as an example, though similar methods apply to other types of systems, such as Linux and other Unix-like systems.

a. Candidate malicious object 510 calls NtCreateProcess to create legitimate process 520.
b. Legitimate process 520 comes into existence. Kernel 540 creates a callback called ProcessCreated.
c. Candidate malicious object 510 calls NtCreateThread. Legitimate process 520 now has a thread. Kernel 540 creates a callback called ThreadCreated.
d. Candidate malicious object 510 calls Loadimage.
e. Legitimate process 520 is now mapped to the image loaded by candidate malicious object 510. Kernel 540 creates a callback called ImageLoadCallback.
f. If the thread is not suspended, candidate malicious object 510 calls resume thread. Process 520 then starts running and optionally loads other DLLs. It then begins performing work.

Note that the initial thread of legitimate process 520 is always created suspended. CreateProcess will resume the initial thread unless it is told not to. Thus, in an example, security agent 224 may detect instructions not to resume. When candidate malicious object 510 creates legitimate process 520 and instructs the process not to resume, this may be considered suspicious behavior.

When the process is malicious, candidate malicious object 510 creates legitimate process 520 with its initial thread suspended. Candidate malicious object 510 then modifies suspended thread 530 to insert its own malware objects. This creates subverted process 182, which may be considered a malware object. Security agent 224 may detect the suspicious behavior and trace subverted process 182 back to candidate malicious object 510. Thus, candidate malicious object 510 may itself be treated as a malware object, and appropriate remedial action may be taken.

For security agent 224 to detect suspended thread 530, several methods may be used by way of nonlimiting example.

In one example, in a process creation hook, security agent 224 may look for the "create suspended" flag when legitimate process 520 is created. It may then check for malicious events before the "resume" call is made.

In another example, in a process creation hook, security agent 224 may mark the new process as "of interest" and set "number of threads in process" to zero. In a thread creation hook, security agent 224 may then see if it is the first thread and look for the "create suspended" flag. It may also check for malicious events before the "resume" call is made.

In another example, in a process creation hook, security agent 224 may mark the new process as "interesting" and set "number of threads in process" to zero. In a thread creation hook, security agent 224 may see if it is the first thread. It may check for malicious events before the "resume" call is made. In the resume call. In the "resume" call, security agent 224 may determine whether the call was made from within the create process call or not. If not, then thread may be deemed to have been created suspended.

Detecting suspended process creation may also be performed from with from hooks within candidate malicious object 510. In this case, security agent 224 may hook CreateProcess and look for the CreateSuspended flag.

In another example, security agent 224 may hook NtCreateProcess, NtCreateThread, and NtResumeThread, and check whether NtResumeThread is called from inside CreateProcess or not. Security agent 224 may then check for malicious events between NtCreateThread and NtResumeThread.

Examples of ways that a malicious object may subvert a legitimate object include the following, by way of nonlimiting example:
a. Writing new binary code over the entry point of the target process, thus overwriting the target process binary code
b. Writing executable code into newly allocated or existing target process memory and introduce a jump at the target process entry point to that process memory.
c. Creating a remote thread on the target process.
d. Introducing a patch on the import address table to cause malware code to be executed.

Legitimate processes may also partly overwrite other legitimate processes, but will generally do so in a way that preserves the functionality of the target process as is necessary for compatibility. For example, user mode hooks will redirect back to the target process code after the new code is executed. Some malware may also do this, but those cases may, for example, be eliminated through whitelisting.

To intercept such malicious behavior, examples of malicious or suspicious behavior that security agent 224 may detect include the following:
a. Creating another thread. This may be done from a user mode hook in candidate malicious object 510 or a kernel mode callback.
b. Modifying code. This may be done from a user mode hook in candidate malicious object 510 or in a hypervisor memory monitor.
c. Modifying thread state, such as the start address. This may be done from a user mode hook in candidate malicious object 510.
d. Modifying data, such as the process environment block (PEB) or thread environment block (TEB). This may be done from a user mode hook in candidate malicious object 510 or a hypervisor memory monitor.
e. Queuing asynchronous procedure call (APC) to the new thread. This may be done from a user mode hook in candidate malicious object 510.

It should also be noted that candidate malicious object 510 may comprise more than one discrete malware process cooperating to exploit legitimate process 520. For example, if candidate malicious object 510 (A) intends to compromise legitimate process 520 (B), the following may occur, by way of illustrative and nonlimiting example:
a. A creates B suspended.
b. A creates C, D, and E.
c. C injects code into B (legitimate object 520).
d. D creates a thread into B.
e. E resumes the main thread in B.

Thus, security agent 224 may be configured to intelligently trace all of these various threads and processes back to B and take appropriate remedial action. It should be noted that in many of the examples, security agent 224 will be triggered by changes to legitimate process 520 rather than by specific actions taken by candidate malicious object 510.

Once a malicious activity has been detected, there are numerous remedial actions that can also be taken. For example, malware object 182 may be removed, quarantined, subjected to deep analysis, or provided to security services provider 190 for additional analysis.

Figure 6:
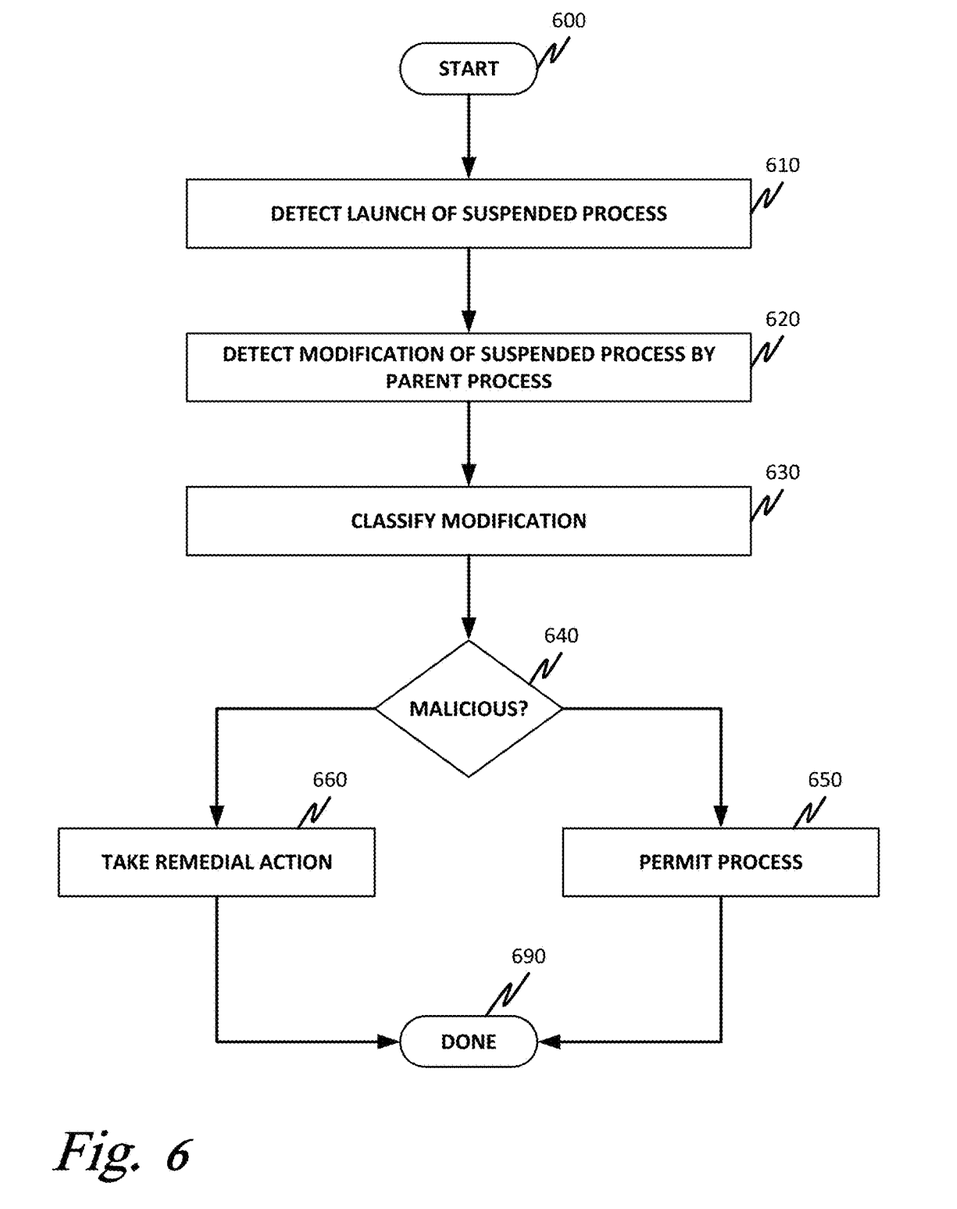
FIG. 6 is a flow chart of a method of detecting malicious activity according to one or more examples of the present specification.

FIG. 6 is a flow chart of a method 600 performed by security agent 224 according to one or more examples of the present specification.

In block 610, security agent 224 detects a launch of a suspended process. Detection may take any of the forms discussed herein, or any other suitable method.

In block 620, security agent 224 detects a modification of the suspended process by the "parent" process (i.e., the process that launched). Detection of modifications may be performed according to any of the methods disclosed herein.

In block 630, security agent 224 classifies the modification. This may be according to any of the classification schemes or methods discussed herein.

In decision block 640, security agent 224 determines whether the modification is malicious. Determining which modifications are malicious may be performed according to any of the methods disclosed herein.

If the modification is classified as not malicious, then in block 650, the process is allowed to execute normally. On the other hand, if the modification is classified as malicious, then in block 660, remedial action may be taken according to the methods described herein.

In block 690, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example, a computing apparatus, comprising: one or more logic elements comprising a security agent operable for: detecting that a first process has launch a second process and placed the second process in a suspended state; detecting that the first process has modified or attempted to modify the second process; classifying the modification as potentially malicious; and taking a remedial action.

There is further disclosed an example wherein the security agent is further operable for classifying the modification as non-malicious, and permitting the first process to execute.

There is further disclosed an example wherein detecting that the first process has placed the second process in a suspended state comprises identifying a create-suspended flag.

There is further disclosed an example wherein detecting that the first process has placed the second process in a suspended state comprises detecting that a number-of-threads counter has been set to zero.

There is further disclosed an example wherein detecting that the first process has placed the second process in a suspended state comprises detecting that no "resume" instruction has been issued for the process.

There is further disclosed an example wherein detecting that the first process has placed the second process in a suspended state comprises inserting operating system hooks.

There is further disclosed an example wherein detecting that the first process has placed the second process in a suspended state comprises inserting application-level hooks.

There is further disclosed an example wherein classifying the modification as potentially malicious comprises determining that the first process has overwritten an entry point of the second process.

There is further disclosed an example wherein classifying the modification as potentially malicious comprises detecting that the first process has introduced a jump or branching instruction at or near an entry point of the second process.

There is further disclosed an example wherein classifying the modification as potentially malicious comprises detecting that the first process has created a remote thread on the second process.

There is further disclosed an example wherein classifying the modification as potentially malicious comprises detecting that the first process has modified an import address table.

There is further disclosed an example wherein classifying the modification as potentially malicious comprises providing an operating system or user-mode hook.

There is further disclosed an example wherein classifying the modification as potentially malicious comprises detecting that the first process has launched a plurality of processes that together effect a modification to the second process.

There is further disclosed an example of one or more tangible, non-transitory computer-readable storage mediums having stored thereon executable instructions for instructing one or more processors for providing a security agent operable for performing any or all of the operations of the preceding examples.

There is further disclosed an example of a method of providing a security agent comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   a processor;
   a memory; and
   one or more logic elements comprising a security agent configured to:
   first detect that a first process has launched a second process and placed the second process in a suspended state, comprising identifying a create-suspended flag, and further comprising detecting that no "resume" instruction has been issued for the process;
   second detect that after placing the second process in the suspended state, the first process has modified or attempted to modify the second process, comprising detecting that the first process has modified an import address table;
   classify the first process as potentially malicious, based at least in part on the first detecting in combination with the second detecting; and
   take a remedial action.

2. The computing apparatus of claim 1, wherein the security agent is further configured to classify the modification as non-malicious, and permitting the first process to execute.

3. The computing apparatus of claim 1, wherein detecting that the first process has placed the second process in a suspended state comprises detecting that a number-of-threads counter has been set to zero.

4. The computing apparatus of claim 1, wherein detecting that the first process has placed the second process in a suspended state comprises inserting operating system hooks.

5. The computing apparatus of claim 1, wherein detecting that the first process has placed the second process in a suspended state comprises inserting application-level hooks.

6. The computing apparatus of claim 1, wherein classifying the first process as potentially malicious comprises determining that the first process has overwritten an entry point of the second process.

7. The computing apparatus of claim 1, wherein classifying the first process as potentially malicious comprises detecting that the first process has introduced a jump or branching instruction at or near an entry point of the second process.

8. The computing apparatus of claim 1, wherein classifying the first process as potentially malicious comprises detecting that the first process has created a remote thread on the second process.

9. The computing apparatus of claim 1, wherein classifying the first process as potentially malicious comprises providing an operating system or user-mode hook.

10. The computing apparatus of claim 1, wherein classifying the first process as potentially malicious comprises detecting that the first process has launched a plurality of processes that together effect a modification to the second process.

11. One or more tangible, non-transitory computer-readable storage mediums having stored thereon executable instructions for providing a security engine configured to:
   first detecting that a first process has launched a second process and placed the second process in a suspended state, comprising identifying a create-suspended flag, and further comprising detecting that no "resume" instruction has been issued for the process;
   second detecting that after placing the second process in the suspended state, the first process has modified or attempted to modify the second process, comprising detecting that the first process has modified an import address table;
   classifying the first process as potentially malicious, based at least in part on the first detecting in combination with the second detecting; and
   taking a remedial action.

12. The one or more tangible, non-transitory computer-readable storage mediums of claim 11, wherein detecting that the first process has placed the second process in a suspended state comprises detecting that a number-of-threads counter has been set to zero.

13. The one or more tangible, non-transitory computer-readable storage mediums of claim 11, wherein detecting that the first process has placed the second process in a suspended state comprises inserting operating system hooks.

14. The one or more tangible, non-transitory computer-readable storage mediums of claim 11, wherein detecting that the first process has placed the second process in a suspended state comprises inserting application-level hooks.

15. The one or more tangible, non-transitory computer-readable storage mediums of claim 11, wherein classifying the first process as potentially malicious comprises determining that the first process has overwritten an entry point of the second process.

16. The one or more tangible, non-transitory computer-readable storage mediums of claim 11, wherein classifying the first process as potentially malicious comprises detecting that the first process has introduced a jump or branching instruction at or near an entry point of the second process.

17. The one or more tangible, non-transitory computer-readable storage mediums of claim 11, wherein classifying the first process as potentially malicious comprises detecting that the first process has created a remote thread on the second process.

18. A computer-executable method of providing a security agent, comprising:
   first detecting that a first process has launched a second process and placed the second process in a suspended state, comprising identifying a create-suspended flag, and further comprising detecting that no "resume" instruction has been issued for the process;
   second detecting that after placing the second process in the suspended state, the first process has modified or attempted to modify the second process, comprising detecting that the first process has modified an import address table;
   classifying the first process as potentially malicious, based at least in part on the first detecting in combination with the second detecting; and
   taking a remedial action.

* * * * *